United States Patent [19]

Stefani et al.

[11] Patent Number: 4,739,436
[45] Date of Patent: Apr. 19, 1988

[54] SURGE SUPPRESSION CIRCUIT

[75] Inventors: Joseph P. Stefani, Warwick; Dewey L. Harris, Coventry; Paul G. Huber, West Warwick, all of R.I.

[73] Assignee: General Electric Company, Schenectady, N.Y.

[21] Appl. No.: 942,483

[22] Filed: Dec. 15, 1986

[51] Int. Cl.⁴ .............................................. H02H 9/04
[52] U.S. Cl. ........................................ 361/56; 361/91; 361/104; 361/127; 363/50
[58] Field of Search .................... 361/54–56, 361/91, 104, 106, 111, 117–118, 124–127; 363/50; 323/366, 369; 340/638–639, 652, 656, 660, 662

[56] References Cited

U.S. PATENT DOCUMENTS 4,089,032 5/1978 Dell Orfano ........................... 361/56
4,288,833 9/1981 Howell ............................... 361/56 X
4,547,827 10/1985 Shedd ............................... 361/104 X
4,587,588 5/1986 Goldstein ........................... 361/56 X

OTHER PUBLICATIONS

"IEEE Guide for Surge Voltages in Low-Voltage AC Power Circuits", IEEE Std. 587-1980, IEEE Inc., pp. 1–25.

Primary Examiner—Peter S. Wong
Attorney, Agent, or Firm—Nathan D. Herkamp; Edward M. Corcoran; Philip L. Schlamp

[57] ABSTRACT

A voltage surge suppression circuit employs two series connected metal oxide varistors and a power interrupter to provide suppression of all modes of voltage surge while providing protection against failure of either metal oxide varistor. An indicator is provided to indicate the status of the circuit to the user.

11 Claims, 4 Drawing Sheets

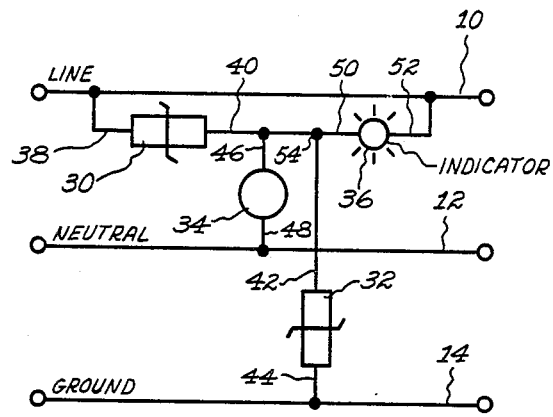
Fig. 3
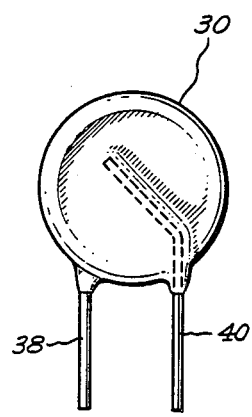 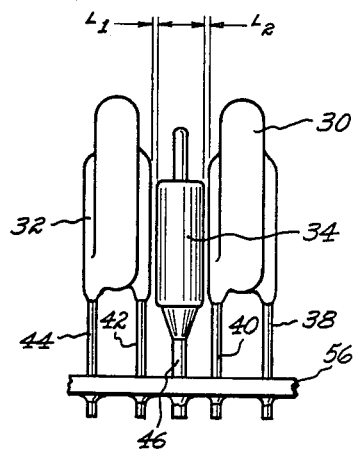
Fig. 4(a)　　Fig. 4(b)

SURGE SUPPRESSION CIRCUIT

BACKGROUND OF THE INVENTION

1. Field of the Invention

This invention is related to transient voltage surge suppression circuits and, more particularly, to a circuit arrangement for voltage surge suppression which provides protection against voltage surges and against failure of the components of the suppression circuit.

2. Description of the Prior Art

It has been determined that transient voltage surge suppressors are needed to protect consumer electronic equipment now commonly found in consumer households. Products such as microwave ovens and personal computers are susceptible to very short duration transient voltage spikes. A characterization of these spikes is provided by the Institute of Electrical and Electronic Engineers, IEEE Standard 587-1980. This standard describes voltage surges with durations of typically about 28 microseconds, peak voltages of about 6000 volts and peak follow current of about 3000 amperes. Even though the surges are of very short duration a cumulative effect occurs and causes premature appliance failure. One method of suppressing these surges is to use metal oxide varistors, such as are used in the voltage spike protectors sold by General Electric Company under its registered trademark GE-MOV®, in combination with a current tap to limit or clamp these surges to safe operating levels. The energy of the surge is absorbed by the metal oxide varistor (MOV) instead of the attached appliance. This arrangement works well until the MOV reaches its end of life. The primary failure mechanism of an MOV is to go into a low resistance mode causing burning and smoking of the varistor, which can be alarming and disruptive to the consumer. A significant improvement would be achieved by providing a reliable protection means that allows the MOV to clamp surges effectively and also sense when the MOV end of life is approaching and remove power from the MOV prior to any failure of the MOV.

In a common household outlet as shown schematically in FIG. 1a the receptacle has three conductors: line 10, neutral 12 and ground 14. Surges may be generated from line to neutral, line to ground or neutral to ground. It is therefore desirable to provide a product to protect all three possible surge modes. Prior art surge suppressors utilize an MOV 16 connected from line to neutral as shown in FIG. 1a, but provide no protection of the MOV itself or indication to the user that the MOV is nearing its end of life. An alternative prior art surge suppressor uses the arrangement shown in FIG. 1b with a current limiting fuse or a temperature sensitive switch 18 to disconnect the MOV 16 from the power source. This arrangement was unsatisfactory from a surge suppression standpoint, because surges from either line to ground or neutral to ground are not suppressed, and thus the equipment is still vulnerable to certain types of surges. The prior art addressed this problem by the use of three MOV's, one 20 connected from line to neutral, one 22 connected from line to ground and one 24 connected from ground to neutral as shown in FIG. 2a. None of the MOV's as shown in FIG. 2a are protected from current or temperature variations beyond the normal operating condition. An alternative circuit is shown in FIG. 2b in which a current limiting fuse or switch 26 is connected in series with the line to neutral MOV 20 with the other two MOV's 22 and 24 having no similar protection.

Another alternative prior art arrangement is shown in FIG. 2c in which a current limiting fuse or switch 28 is connected in series with the MOV 22 connected between line 10 and ground 14 with no other protection used for the line to neutral MOV 20 or neutral to ground MOV 24. Yet another prior art arrangement is illustrated in FIG. 2d in which one MOV 22 is connected from line to ground and a second MOV 24 is connected from neutral to ground. If the MOV 22 connected from line to ground should fail short a direct short from line to ground is created. This may create a substantial hazard to the user if the user's appliance has a defective or unconnected ground, because the housing of the appliance would then receive full line voltage. In each of the embodiments shown in FIGS. 1 and 2 no mechanism is provided to protect against end of life failure of any of the MOV's. The user has no indication that a particular MOV was about to fail or that the circuit protection was no longer reliable.

SUMMARY OF THE INVENTION

An object of the present invention is to provide complete surge suppression for a power supply line. Another object of the present invention is to provide surge suppression with a minimum number of protection components. Another object of the present invention is to provide an arrangement of protected MOV's such that no single point failure in a device connected to a receptacle including the present invention could cause a safety hazard. A still further object of the present invention is to provide a surge suppressor having a visual or audible indication that the surge suppressor is operating satisfactorily.

The present invention accomplishes the above stated objectives with a circuit employing a pair of metal oxide varistors and a current sensitive power interrupter connected to the metal oxide varistors to operate in response to any current surge beyond a predetermined level or temperature rise beyond a predetermined temperature to disconnect power from the circuit and the MOVs. The power interrupter may be a current limiting fuse or a temperature cut off switch positioned to detect a temperature rise in either MOV. The circuit also includes an indicator connected to the MOV such that a failure of either MOV is indicated to the operator.

BRIEF DESCRIPTION OF THE DRAWINGS

Further objects and advantages of the present invention, together with its organization, method of operation and best mode contemplated, may best be understood by reference to the following description taken in conjunction with the accompanying drawings in which like reference numbers refer to like elements throughout, and in which:

FIG. 3 is a schematic circuit diagram illustrating the circuit arrangement of the present invention; and FIG. 4 is a schematic plan view of a physical arrangement of the present invention.

DESCRIPTION OF PREFERRED EMBODIMENTS

Figure 1A:
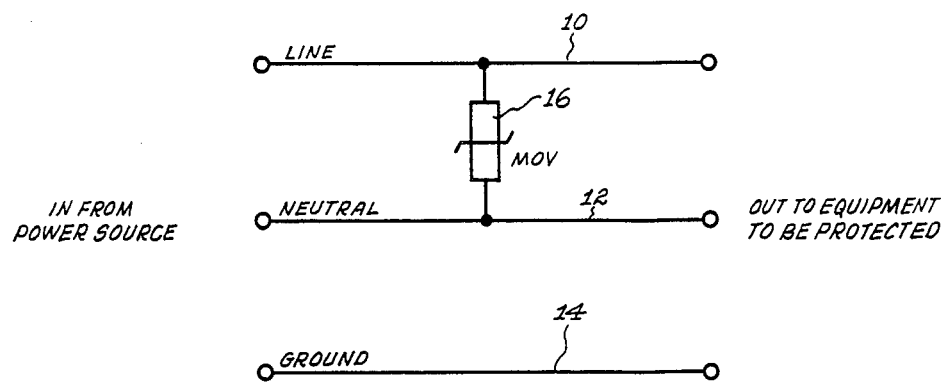
FIGS. 1 and 2 are schematic circuit diagrams illustrating prior art circuit protection arrangements.
Figure 1B:
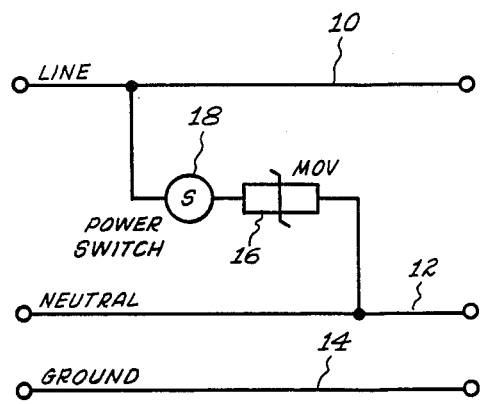

The circuit protection arrangement of the present invention connected to line 10, neutral 12 and ground 14 conductors is shown in FIG. 3. A first terminal 38 of MOV 30 is connected to the line conductor 10, and the other terminal 40 of MOV 30 is connected at a junction point 54 to a first terminal 42 of MOV 32 whose other terminal 44 is connected to the ground conductor 14. Terminal 46 of power interrupter 34 is connected at the junction point 54 and terminal 48 of interrupter 34 is connected to neutral conductor 12. Terminal 50 of indicator 36 is connected to junction point 54 and terminal 52 is connected to line conductor 10. MOV 30 is illustrated in FIG. 4a as a generally circular device having a pair of terminals 38 and 40. The physical arrangement of the MOV's 30 and 32 relative to the power interrupter 34 is shown schematically in FIG. 4b. The MOV's 30 and 32 are placed at spacings L1 and L2, respectively, which are selected to provide sufficient heat transfer from the MOV's to the power interrupter to activate the interrupter when the resistance of either of the MOV's drops to a level allowing a rise in its temperature indicating the approach of end of MOV life.

The present invention operates as a feed-through current tap providing protection for the system in the event of a fault between any two of the three conductors. Under normal operating conditions current passes unimpeded through the device from the source receptacle to the appliance to be protected. In the event that a surge should occur, the following surge current paths are provided. In the case of a surge from line to neutral the surge of power is diverted by MOV 30 through the power interrupter 34 to neutral 12 shorting out the power surge. In the case of a surge from neutral to ground the surge of power flows through the power interrupter 34 through MOV 32 to ground diverting the surge away from the attached appliance. Should a surge occur from line to ground the surge current flows first through MOV 30 and then through MOV 32 shorting the surge energy away from the protected appliance. During normal operation power for the indicator 36 flows from the line conductor 10 through the power interrupter 34 to the neutral conductor 12. When the power interrupter 34 cuts off indicating MOV failure, the power to the indicator 36 is reduced causing the indicator to be turned off indicating to the user that the MOV has failed. The construction shown in FIG. 3 allows use of fewer parts than the prior art three MOV configuration. The present invention uses only two MOV's and only one power interrupter to provide complete protection against all surge modes. The indicator 36, while not essential to surge suppression, serves to alert the user of any failure of either MOV. Further, the present invention plans only one MOV under continuous voltage stress as described below.

One embodiment of the present invention employs a current limiting fuse as the power interrupter 34. The fuse is selected such that its $I^2t$ power cut off limit is less than or equal to the MOV power handling capability. The $I^2t$ power cut-off limit is the current, I, squared times time, t, rating of the fuse provided by the manufacturer for typical current limiting fuses. When surges of less than the $I^2t$ limit occur, the current is allowed to flow through the fuse and the series connected MOV. When a surge occurs having a power level in excess of the $I^2t$ rating of a fuse, the fuse opens preventing the MOV from absorbing energy beyond its specification. As will be understood the $I^2t$ characteristic of the fuse is used to select a fuse that will open at a level below the specified limit of the MOV power absorbing capability to prevent surges behnd the power capacity of the MOV from reaching the MOV. The advantage of this current limiting fuse in combination with the MOVs are that it prevents MOV failure by limiting surges to levels within the current handling capability of the MOV and it is inexpensive. A limitation of the arrangement employing a fuse is that MOV's can often handle surges beyond their specification minimum, yet if the fuse is selected such that it will open at below the MOV rating which must be done for the fuse to properly protect the MOV, the MOV protection will be removed from the user's appliance at a current level actually below that which the MOV is capable of handling. Additionally, a fuse prevents only very large surges from being absorbed by the MOV and allows lower level currents to pass. This characteristic of a fuse limits the performance of the circuit protection. A known characteristic of MOV's is the gradual reduction of resistance after exposure to a large number of surges less than the specification limit. The resistance of the MOV initially is quite large, but over time as exposure to low level currents continues the resistance level of the MOV decreases allowing the standby current, that is the current which passes through the MOV when connected across a normally operating power source, to increase significantly over a period of time. This failure mechanism is not sensed by the fuse, because the low current does not provide an $I^2t$ level capable of blowing the fuse. If the size of fuse were selected such that normal standby current would produce the $I^2t$ level sufficient to cause opening of the fuse the MOV would be prevented from providing the surge suppression required. Therefore, the fuse must have an $I^2t$ characteristic high enough to allow continuous flow of standby current, and therefore the embodiment of the present invention employing a fuse as the power switch has a limited life. The leakage current through a normally operated MOV can be a hazard if the leakage is from line to ground and the user has a faulty ground allowing the leakage to raise the protected appliance's enclosure potential to line voltage.

A particularly preferred embodiment of the present invention employs a temperature sensitive switch as the power interrupter 34 connected as shown in the circuit of FIG. 3. Under normal operation and under surge operation the current flows are identical to the fused circuit operation. However, in the case where a surge of greater than the MOV specification occurs, the thermal cut-off, TCO, 34 still allows the surge to be clamped by the MOV. TCO 34 senses MOV temperature and interrupts power if the sensed temperature exceeds a predetermined level. The rise in MOV temperature is an indication that the standby current is beyond normal limits, and the MOV should be removed from the power circuit. If a surge occurs which is in excess of the MOV power handing capability specification but within the capacity of MOV 30 to handle without failure due to MOV materials or construction, the TCO 34 allows the MOV 30 to absorb the power up to the point at which its temperature exceeds the activation temperature of the thermal cut out. Thus the use of a thermal cut-out allows a more complete protection against surges by not artificially limiting the surge power absorbed by the MOV but instead allowing the MOV temperature to control power interruption. In the case where a large energy surge is absorbed by the MOV in excess of its inherent power handling capability, the MOV will heat up to the point that the TCO opens and removes the power from the MOV so that the MOV will not fail. In the case where a MOV has aged under constant voltage stress or has absorbed a sufficient number of surges to cause its standby current to increase, its steady state power dissipation increases causing a temperature rise in the MOV. The temperature rise, which occurs before the MOV actually flames or smokes, is sensed by the TCO 34 which interrupts power from the MOV preventing the MOV from reaching a temperature sufficient to cause smoke or flame.

It should be noted that the physical arrangement of the MOV's relative to the thermal cut-off is of significance to the proper operation of this invention. The body of the MOV must be within 0.03 inch of the surface of the TCO device in order for the TCO to operate properly. The surfaces of the MOVs need not be parallel to each other as shown in FIG. 4b, so long as the spacing, L1 and L2, of the surface of the MOV is within 0.03 inch of the TCO. The pancake construction of metal oxide varistors having one electrode on each side of the relatively thin disc also adds a constraint to the mechanical placement of the MOV's. The thermal cut off is electrically uninsulated so that for proper operation the sides of the MOV's placed in close proximity with the thermal cut off device must be connected to the same electrical potential as the thermal cut off body to prevent accidental shorting when the MOV fails. For example, as shown in FIG. 4(b) terminal 40 of MOV 30 and terminal 42 of MOV 32 are adjacent TCO 34 so that the surfaces of the respective MOVs are at the same potential as the TCO.

The use of the thermal cut out device for the power interrupter function allows power to be removed from the MOV under conditions where the temperature of the MOV has risen although the standby current of the MOV has increased to less than 10 milliamperes, yet the TCO is capable of passing current from surges in excess of 5000 amperes to the MOV for suppression without interrupting the power. Thus, the MOV and TCO arrangement gives the most complete surge suppressing capability.

Figure 2A:
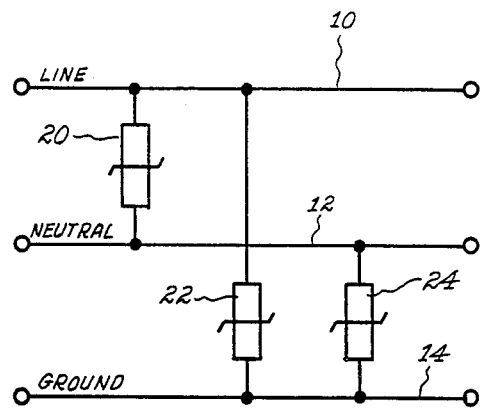
Figure 2B:
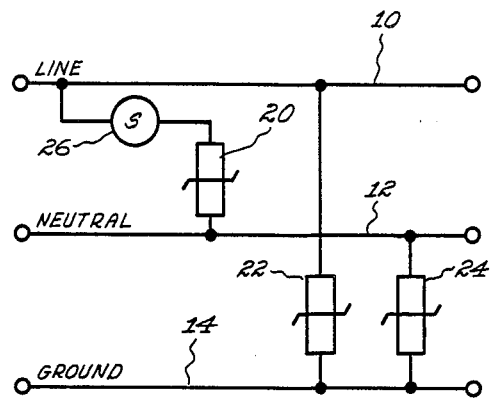
Figure 2C:
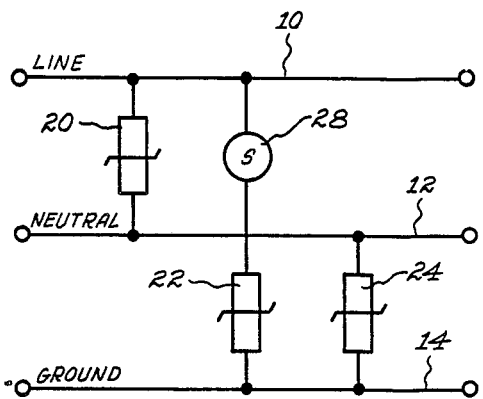
Figure 2D:
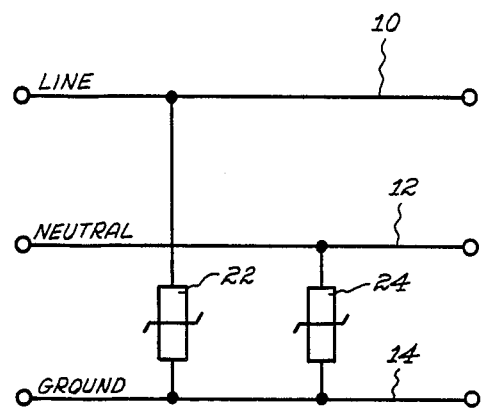

The connection of two varistors in series and connected to a power interrupting device as shown in FIG. 3. provides significant performance and safety advantages when compared with either single MOV or triple MOV devices. When compared to a single MOV device the invention additionally protects against the common mode surges, that is surges from line to ground and are suppressed by the series combination of MOV 30 and MOV 32, and surges from neutral to ground are suppressed by the series combination of power interrupter 34 and MOV 32. When compared to a triple MOV device the invention features a longer product life. This is because product life is primarily determined by the MOV's performance under continuous voltage stress. In prior art triple MOV voltage surge suppressors of the type shown in FIGS. 2(a), 2(b) and 2(c) the varistors 20 and 22 connected from line to neutral and line to ground, respectively are both under constant voltage stress. When either MOV 20 or MOV 22 reaches the point at which its resistance declines sufficiently to cause current to rise to the point of heating the MOV, the circuit fails. Therefore, the device life is limited by the shorter life of two stressed MOVs. In a triple MOV device a line to ground MOV failure short can cause a significant safety hazard, because the line voltage will be shorted directly to ground.

In contrast in the present invention only the varistor 30 connected from line to neutral is under constant voltage stress. Because only one MOV is under continuous voltage stress, only that MOV limits the life of the surge suppression device and the life of the total surge suppression device is longer than that of a comparable three MOV device in which more than one MOV is continuously stressed. In the case where a power supply receptacle has a faulty ground, that is, either a high resistance ground or a disconnected ground, no single point failure of a component of the circuit of the present invention can cause a safety hazard, because the interrupter 34 will open the short or the series connected MOVs will absorb the surge. In the case where a power supplying receptacle is reverse wired, that is line and neutral conductors are interchanged, low levels of ground current leakage caused by an MOV nearing end of life will be sensed by the TCO to remove power and prevent any further ground current from occurring.

The surge suppression circuit of the present invention is applicable to many types of three-wire electrical power supply systems. The component values and sizes will be selected based on the voltage of the power supply system and the internal protection of applicances connected to the power supply. For example, certain microwave ovens include a surge suppression device within the appliance itself. The components of an external surge suppression circuit of the present invention would preferably be selected to clamp any surge voltage at a level below the clamping level of the appliance's built-in surge suppression device, to avoid the loss of the applicance caused by circuit interruption of the internal surge suppressor. For example, many internal surge suppressors clamp voltage surges at about 600 to 800 volts. Therefore, the external circuit would be selected to clamp the voltage at no greater than 600 volts. Many devices have no internal surge suppressor, and in those cases the external suppression would be designed to clamp surges at a voltage level, typically 1000 volts or less, low enough to prevent internal damage to the electrical device. The present invention allows ease of design, because only a few components are required and those component values can be selected for the particular circuit protection required.

As is clear from the above description, the present invention provides superior surge suppression while requiring fewer components than prior art systems and providing longer product life. Therefore, the present invention represents a substantial improvement in the art of voltage surge suppression.

What we claim as new and desire to secure by Letters Patent of the United States is:

1. A voltage surge suppression circuit for a power supply system including a line conductor, a neutral conductor and a ground conductor comprising:

a first metal oxide varistor having a first terminal connected to said line conductor and a second terminal;

a power interrupter comprising a temperature sensitive power cut off switch which is normally closed and which opens when the temperature of said switch is raised to a predetermined level for interrupting current therethrough when said current exceeds a predetermined limit, said interrupter having a first terminal connected to said second terminal of said first metal oxide varistor and a second terminal of said power interrupter connected to said neutral conductor; and a second metal oxide varistor having a first terminal connected to said second terminal of said first metal oxide varistor and a second terminal of said second metal oxide varistor connected to said ground conductor.

2. The invention of claim 1 wherein said temperature of said power interrupter is raised to said predetermined level heat transfer from either of said metal oxide varistors.

3. The invention of claim 2 further comprising:
indicator means for indicating the condition of said first and second metal oxide varistors having a first terminal connected to the junction of said second terminal of said first metal oxide varistor and said first terminal of said second metal oxide varistor and a second terminal of said indicator means connected to said line conductor.

4. The invention of claim 1 wherein said power cut off switch is in heat exchange relationship with both of said metal oxide varistors.

5. The invention of claim 4 wherein
said first metal oxide varistor is disposed adjacent said cut-off switch such that the surface of said first metal oxide varistor adjacent the outer surface of said cut-off switch is spaced from said outer surface of said power cut-off switch a distance of not greater than 0.03 inch.

6. The invention of claim 5 wherein
said second metal oxide varistor is disposed adjacent said cut-off switch such that the surface of said second metal oxide varistor adjacent the outer surface of said cut-off switch is spaced a distance of not greater than 0.03 inch from said outer surface of said cut-off switch.

7. The invention of claim 6 wherein
indicator means for indicating the condition of said first and second metal oxide varistors having a first terminal connected to the junction of said second terminal of said first metal oxide varistor and said first terminal of said second metal oxide varistor and a second terminal of said indicator means connected to said line conductor.

8. A voltage surge suppression circuit for a power supply system including a line conductor, a neutral conductor and a ground conductor, said voltage surge supression circuit consisting essentially of:
(i) a first metal oxide varistor having a first and second terminal, said first terminal connected to said line conductor;
(ii) a second metal oxide varistor having a first and second terminal, wherein said first terminal thereof is connected to said second terminal of said first metal oxide varistor and wherein said second terminal is connected to said ground conductor, and
(iii) a temperature sensitive power cut-off switch for interrupting current through said surge suppression circuit when said current exceeds a predetermined level, said switch having a first terminal connected to said second terminal of said first metal oxide varistor and a second terminal connected to said neutral conductor, said switch being normally closed and which opens when the temperature of said switch is raised to a predetermined level by heat transfer from either of said metal oxide varistors which heat up when the current therethrough exceeds said predetermined level.

9. The circuit of claim 8 wherein said power cut-off switch is in heat exchange relationship with both of said metal oxide varistors.

10. The circuit of claim 9 wherein both of said metal oxide varistors are disposed adjacent said power cut-off switch such that the surface of said varistors adjacent the outer surface of said switch is spaced apart therefrom at a distance not exceeding 0.03 inches.

11. The circuit of claim 10 further containing indicator means for indicating the condition of said first and second metal oxide varistors, said indicator means having a first and a second terminal, wherein said first terminal is connected to the junction of said second terminal of said first metal oxide varistor and said first terminal of said second metal oxide varistor and wherein said second terminal of said indicator means is connected to said line conductor.

* * * * *